(12) United States Patent
Kim

(10) Patent No.: US 10,142,559 B2
(45) Date of Patent: Nov. 27, 2018

(54) PIXEL SIGNAL TRANSFER DEVICE AND METHOD THEREOF AND CMOS IMAGE SENSOR INCLUDING THE SAME

(71) Applicant: SK hynix Inc., Gyeonggi-do (KR)

(72) Inventor: Tae-Gyu Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/437,676

(22) Filed: Feb. 21, 2017

(65) Prior Publication Data
US 2017/0359521 A1   Dec. 14, 2017

(30) Foreign Application Priority Data
Jun. 9, 2016   (KR) .................... 10-2016-0071555

(51) Int. Cl.
| H04N 5/243 | (2006.01) |
| H04N 5/351 | (2011.01) |
| H04N 5/369 | (2011.01) |
| H04N 5/3745 | (2011.01) |
| H04N 5/378 | (2011.01) |

(52) U.S. Cl.
CPC ............ *H04N 5/243* (2013.01); *H04N 5/351* (2013.01); *H04N 5/3698* (2013.01); *H04N 5/378* (2013.01); *H04N 5/37455* (2013.01)

(58) Field of Classification Search
CPC ........ H04N 5/243; H04N 5/378; H04N 5/351; H04N 5/3698; H04N 5/37455
See application file for complete search history.

(56) References Cited

U.S. PATENT DOCUMENTS

| 7,075,049 | B2 * | 7/2006 | Rhodes ............. H01L 27/14603 250/208.1 |
| 8,203,111 | B2 * | 6/2012 | Reshef ............. H01L 27/14609 250/208.1 |
| 8,390,712 | B2 * | 3/2013 | Xu ....................... H04N 5/3745 250/208.1 |
| 9,000,342 | B2 | 4/2015 | Oh |
| 2011/0216231 | A1 * | 9/2011 | Fowler ................... H04N 5/335 348/294 |
| 2013/0153749 | A1 * | 6/2013 | Sakurai ............. H01L 27/14806 250/208.1 |
| 2015/0350584 | A1 * | 12/2015 | Fenigstein ............. H04N 5/355 250/208.1 |

FOREIGN PATENT DOCUMENTS

JP   1998-65971   3/1998

* cited by examiner

*Primary Examiner* — Shahbaz Nazrul
(74) *Attorney, Agent, or Firm* — IP & T Group LLP

(57) ABSTRACT

A pixel signal transfer device includes a transfer block suitable for transferring a pixel output voltage according to an amount of a charge generated from a pixel; a correction block suitable for correcting the pixel output voltage using a threshold voltage of an amplification transistor; and a conversion gain adjusting block including the amplification transistor, the conversion gain adjusting block being suitable for adjusting a conversion gain of the corrected pixel output voltage outputted from the correction block.

19 Claims, 4 Drawing Sheets

PIXEL SIGNAL TRANSFER DEVICE AND METHOD THEREOF AND CMOS IMAGE SENSOR INCLUDING THE SAME

CROSS-REFERENCE TO RELATED APPLICATIONS

The present application claims priority of Korean Patent Application No. 10-2016-0071555, filed on Jun. 9, 2016, which is incorporated herein by reference in its entirety.

BACKGROUND

1. Field

Exemplary embodiments of the present invention relate generally to image sensor technology and, more particularly, to a pixel signal transfer device capable of easily adjusting a conversion gain, a method thereof and a complementary metal oxide semiconductor (CMOS) image sensor including the same.

2. Description of the Related Art

If a pixel of a CMOS image sensor is implemented using a single transistor, a light receiving area may be maximized because a photodiode may be implemented to have a maximum size, and the pixel may be less sensitive to process variation because light received by the photodiode may be converted into a charge and a pixel signal may be directly transferred to an analog-digital converting device without a source follower transistor.

However, in general, because a parasitic capacitor of a column line has a relatively large capacitance when compared to a charge stored therein, a pixel signal (i.e., a pixel output voltage), which is finally outputted from a pixel, has a very small value. Thus, it is difficult for an analog-digital converting device to directly convert this small pixel signal. Also, because a plurality of pixels are coupled to one column line, there are other issues that need to be adequately addressed when the conversion gain of a pixel signal is very low.

To address these issues, conventional technology typically employs an analog-digital converting device that uses an amplifier (i.e., a comparator) at an end terminal of the column line, and adjusts a conversion gain by adjusting a capacitance of a feedback capacitor coupled to input and output terminals of the amplifier.

However, in order to increase the conversion gain by a predetermined value, the capacitance of the feedback capacitor must be a very small value such as 1 to 2 femtofarads (fF). Meanwhile, because a capacitor having a very small capacitance is very sensitive and vulnerable to process variation, it is difficult to control the conversion gain.

SUMMARY

Various embodiments of the present invention are directed to a pixel signal transfer device capable of easily adjusting a conversion gain, a method thereof and a CMOS image sensor including the same. The CMOS image sensor may readily adjust a conversion gain using an element having an insensitive characteristic to process variation when a pixel signal outputted from a pixel is transferred to an analog-digital converting device.

In an embodiment of the present invention, a pixel signal transfer device may include a transfer block suitable for transferring a pixel output voltage according to an amount of a charge generated from a pixel; a correction block suitable for correcting the pixel output voltage using a threshold voltage of an amplification transistor; and a conversion gain adjusting block including the amplification transistor, the conversion gain adjusting block being suitable for adjusting a conversion gain of the corrected pixel output voltage outputted from the correction block.

The transfer block may include a transfer capacitor coupled between a first node and the correction block, wherein the pixel output voltage and a first power supply voltage is supplied to the first node; and a first switch suitable for applying or blocking the first power supply voltage to the first node.

The transfer block may reset a remained charge of the pixel using the first power supply voltage.

The transfer capacitor may be a parasitic capacitor.

The correction block may include second and fourth switches suitable for coupling a second node and a reference current source, the second node is an input node of the correction block, to which the pixel output voltage is provided, and is initialized with a voltage level of a second power supply voltage reduced by a reference voltage and a threshold voltage of the amplification transistor, the reference voltage may be a voltage drop at a first resistor included in the conversion gain adjusting block when the reference current source flows through the first resistor, wherein the first resistor and the amplification transistor are serially coupled between the second power supply voltage and an output node of the conversion gain adjusting block, a gate of the amplification transistor is coupled to the second node, the second switch is coupled between the second node and an output node of the correction block, and the fourth switch is coupled between the reference current source and the output node of the correction block.

The conversion gain adjusting block may include the first resistor coupled to the second power supply voltage; a second resistor coupled to a ground power supply voltage; the amplification transistor coupled between the first resistor and an output node of the conversion gain adjusting block; a third switch coupled between the output node of the conversion gain adjusting block and the second resistor, wherein the conversion gain is adjusted according to the first resistor and the second resistor, and wherein the output node of the correction block and the output node of the conversion gain adjusting block are coupled to each other.

The pixel may be a single transistor pixel including: a photo detector suitable for generating the pixel output voltage according to a charge corresponding to an incident light; and a transfer transistor suitable for transferring the pixel output voltage of the photo detector, wherein the transfer transistor is coupled between the photo detector and the transfer block.

In another embodiment of the present invention, a pixel signal transfer method of a pixel signal transfer device including a photo detector, first and second nodes, a transfer capacitor, first and second resistors and an amplification transistor, the pixel signal transfer method may include resetting the photo detector; performing a photoelectric-converted operation; initializing the first node, and initializing the second node based on a threshold voltage value of the amplification transistor; transferring a photoelectric-converted charge generated through the photoelectric-converted operation; and correcting a pixel output voltage corresponding to an amount of the transferred photoelectric-converted charge.

The resetting of the photo detector may include resetting a remained charge on the photo detector using a first power supply voltage.

The performing of the photoelectric-converted operation may include generating a charge corresponding to an incident light by exposing the photo detector.

The initializing of the first and second nodes may include initializing the first node of the node to the first power supply voltage, and initializing the second node to a second power supply voltage reduced by a reference voltage and a threshold voltage of the amplification transistor.

The transferring of the photoelectric-converted charge may include transferring the photoelectric-converted charge to the transfer capacitor.

The correcting of the pixel output voltage may include correcting the pixel output voltage using a voltage level of the initialized second node; and adjusting a conversion gain using the first and second resistors.

In another embodiment of the present invention, a complementary metal oxide semiconductor (CMOS) image sensor may include a pixel array suitable for generating a charge corresponding to an incident light; a row decoder suitable for selecting each pixel of the pixel array row by row; a ramp signal generation device suitable for generating a ramp signal; a pixel signal transfer device suitable for correcting each pixel output voltage outputted from each pixel of the pixel array using a voltage level of a threshold voltage of an amplification transistor, adjusting a conversion gain, and outputting each pixel signal; a comparison unit suitable for comparing each pixel signal with the ramp signal; a counting unit suitable for counting a clock according to each comparison signal outputted from the comparison unit; a memory unit suitable for storing a counting information outputted from the counting unit; and a column read-out circuit for outputting data stored in the memory unit.

DETAILED DESCRIPTION

Figure 1A:
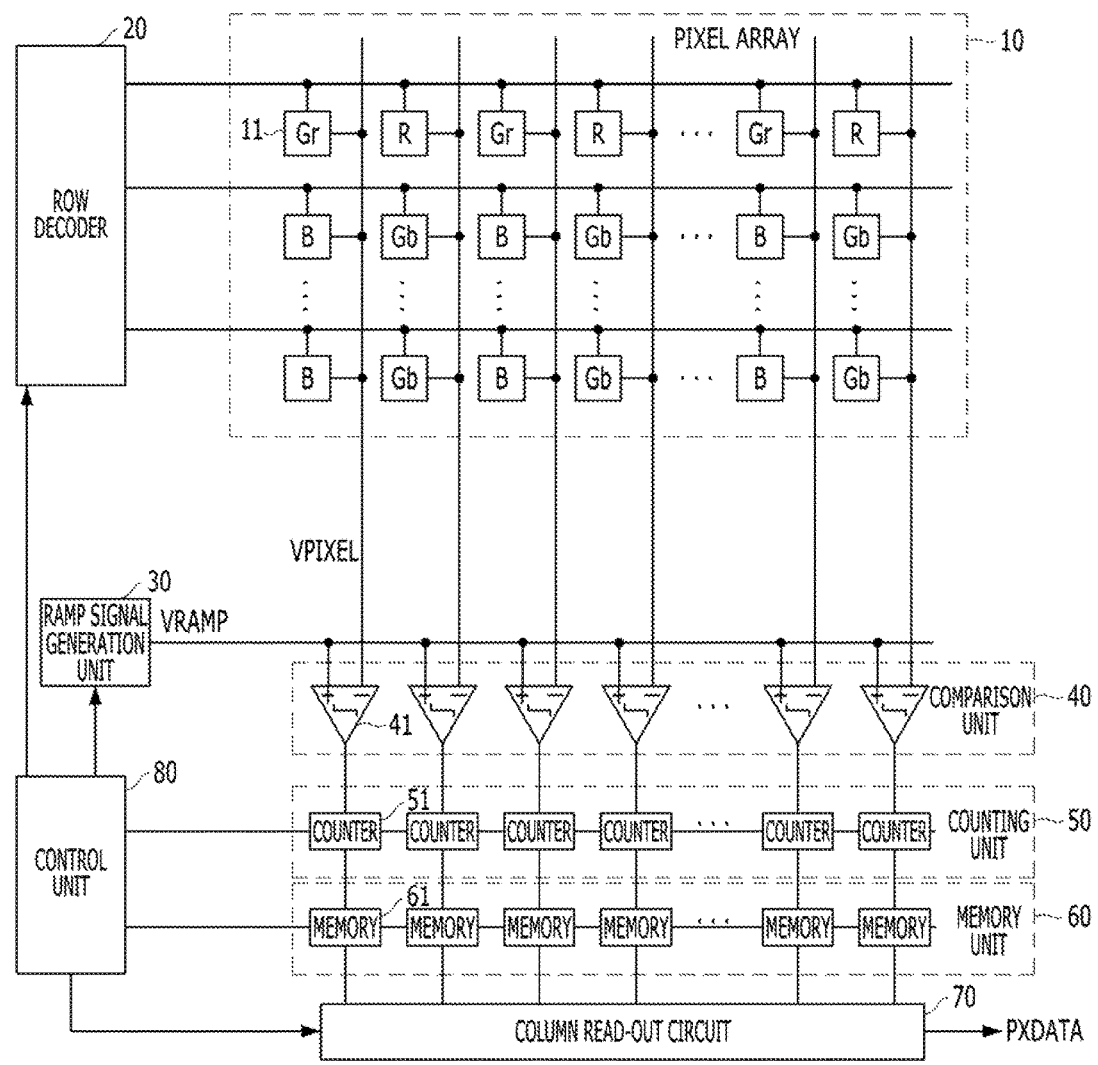
FIG. 1A is a block diagram illustrating a typical CMOS image sensor.

Various embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

Throughout the specification, when an element is referred to as being "coupled" to another element, it may not only indicate that the elements are "directly coupled" to each other, but also indicate that the elements are "electrically coupled" to each other with another element interposed therebetween.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily drawn to scale and, in some instances, proportions may have been exaggerated in order to clearly illustrate features of the embodiments.

The terminology used herein is for the purpose of describing particular embodiments only and is not intended to be limiting of the present invention. As used herein, singular forms are intended to include the plural forms as well, unless the context clearly indicates otherwise.

It will be further understood that the terms "comprises," "comprising," "Includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth for providing a thorough understanding of the present invention. The present invention may be practiced without some or all of these specific details. In other instances, well-known process structures and/or processes have not been described in detail to avoid unnecessarily obscuring the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

Figure 1B:
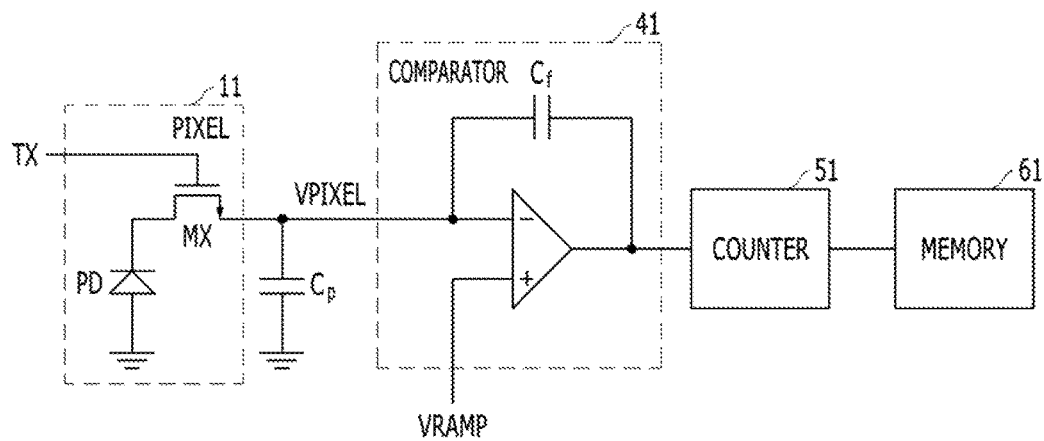
FIG. 1B is a circuit diagram illustrating a circuit of one column shown in FIG. 1A.

FIG. 1A is a block diagram illustrating a typical CMOS image sensor. FIG. 1B is a circuit diagram illustrating a circuit of one column shown in FIG. 1A.

Referring to FIG. 1A, the CMOS image sensor includes a pixel array 10, a row decoder 20, a ramp signal generation unit 30, a comparison unit 40, a counting unit 50, a memory unit 60, a column read-out circuit 70 and a control unit 80.

The pixel array 10 outputs a pixel signal VPIXEL corresponding to an incident light. The row decoder 20 may select and controls a pixel of a pixel array at each row line according to control of the control unit 80.

The ramp signal generation unit 30 may generate a ramp signal VRAMP according to a control of the control unit 80. The comparison unit 40 compares the ramp signal VRAMP received from the ramp signal generation unit 30 with the pixel signal VPIXEL received from the pixel array 10.

The counting unit 50 counts a clock of the control unit 80 according to respective output signals outputted from the comparison unit 40. The memory unit 60 stores the counting information outputted from the counting unit 50.

The column read-out circuit 70 outputs sequentially the stored data of the memory unit 60 as pixel data PXDATA according to the control of the control unit 80. The control unit 80 controls operations of the row decoder 20, the ramp signal generation unit 30, the counting unit 50, the memory unit 60 and the column read-out circuit 70.

To remove an offset value of a pixel in a CMOS image sensor, only a pixel signal VPIXEL, which is caused by an incident light is measured by comparing a pixel signal VPIXEL before and after the incident light is inputted. This method is referred to in the art as a correlated double sampling (CDS). This CDS operation is performed in the comparison unit 40.

The comparison unit 40 includes a plurality of comparators, the counting unit 50 includes a plurality of counters, and the memory unit 60 includes a plurality of memories. One of the plurality of single comparators, one of the plurality of single counters and one of the plurality of single memories are used at each column.

Subsequently, operations of the comparator, the counter and the memory in a column of the conventional image sensor of FIG. 1A will be exemplarily described as below.

Referring to FIGS. 1A and 1B, the pixel 11 includes a photodiode PD and a transfer transistor MX and is disposed at a first column of the pixel array 10. Pixel 11 provides a comparator with the pixel signal VPIXEL corresponding to a light inputted to the photodiode PD when the transfer transistor MX is turned on.

A first comparator 41 among the plurality of comparators receives the pixel signal VPIXEL outputted from the first column of the pixel array 10 through an inverting terminal of the first comparator 41. The first comparator 41 also receives the ramp signal VRAMP outputted from the ramp signal generation unit 30 through a non-inverting terminal of the first comparator 41. The first comparator 41 compares the ramp signal VRAMP with the pixel signal VPIXEL outputted from the first column of the pixel array 10, and outputs a comparison value to the counter 51.

Herein, since a voltage level of the ramp signal VRAMP is increased or decreased as a time elapses while the pixel signal VPIXEL stays constant, there is a time point when the levels of the ramp signal and the pixel signal VPIXEL become the same and then the comparison signal is inverted.

The first counter 51 among the plurality of counters counts the clock outputted from the control unit 80, and outputs the counting information from the rising time or the falling time of the ramp signal VRAMP until the inversion time of the comparison signal outputted from the first comparator 41. Herein, each counter is reset in response to a reset signal outputted from the control unit 80.

A first memory 61 among the plurality of memories stores the counting information outputted from the first counter 51 according to a load signal of the control unit 80, and outputs the stored counting information to the column read-out circuit 70.

Referring to FIG. 1B, since a parasitic capacitor at a column line has a relatively larger parasitic capacitance $C_p$ when compared to a charge amount stored therein, the pixel signal VPIXEL provided to the first comparator 41 is very small. Thus, it is difficult for an analog-digital converting device (e.g., the first comparator 41, the first counter 51 and the first memory 61) to directly convert the pixel signal VPIXEL having the small value. Also, since a plurality of pixels are coupled to one column line, there are demerits that a conversion gain is very low.

In order to solve these problems, as shown in FIG. 1B, a differential amplifier is disposed within the comparator 41, which is located at an end terminal of the column line, and a conversion gain may be adjusted by adjusting a feedback capacitance $C_f$ of a feedback capacitor coupled between the inverting input terminal and an output terminal of the differential amplifier.

However, the feedback capacitance $C_f$ must be a very small such as 1-2 fF level. Meanwhile, since the feedback capacitor having a very small feedback capacitance $C_f$ of 1-2 fF level is highly sensitive and vulnerable to process variation, it is very difficult to control a conversion gain.

In an embodiment of the present invention, when a pixel signal outputted from a pixel is transferred to an analog-digital converting device (e.g., the first comparator 41, the first counter 51 and the first memory 61), a pixel signal transfer device disposed between a pixel array and the analog-digital converting device has a characteristic stable to the process variation and controls the conversion gain easily. These operations and configurations will be described below with reference to FIG. 2A to FIG. 3.

Figure 2A:
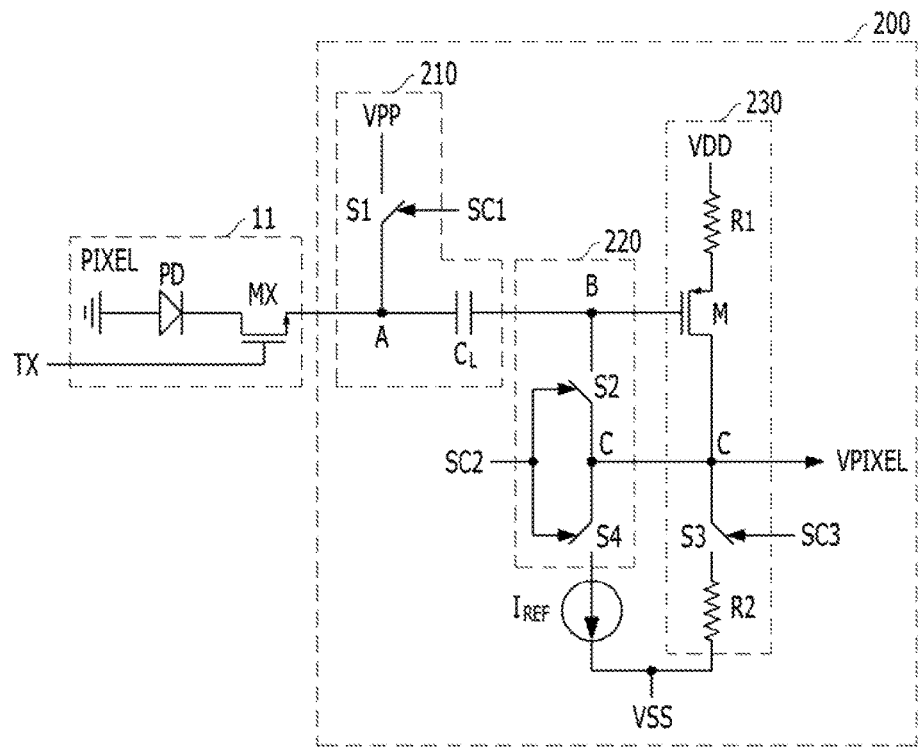
FIG. 2A is a circuit diagram illustrating a pixel signal transfer device, in accordance with an embodiment of the present invention.
Figure 2B:
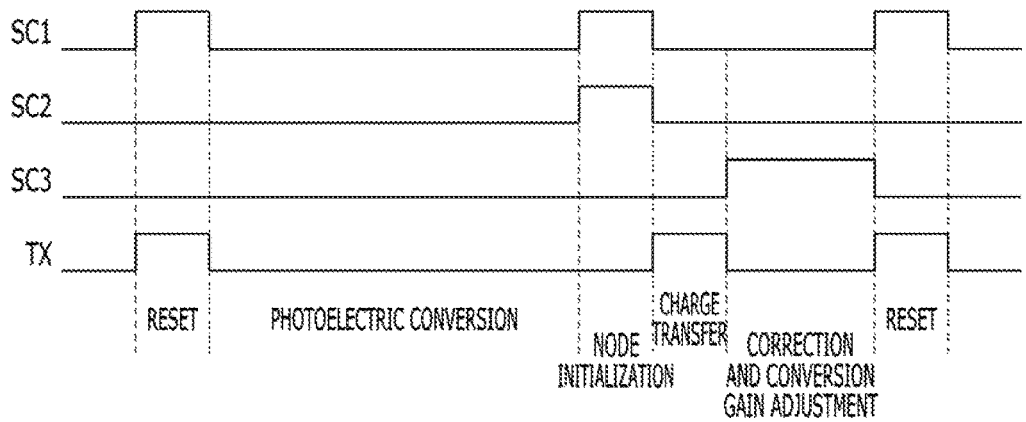
FIG. 2B is a timing diagram illustrating a control signal timing of the pixel signal transfer device shown in FIG. 2A.
Figure 2C:
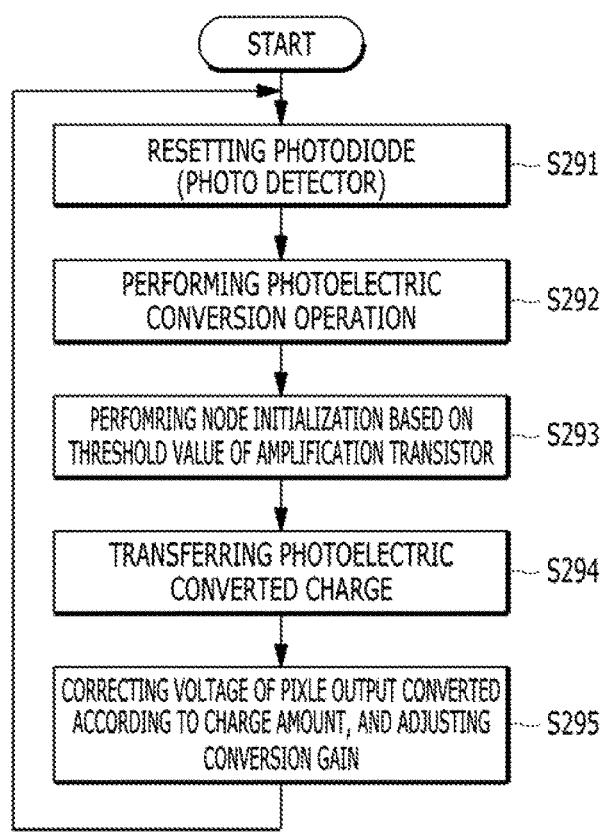
FIG. 2C is a flow chart illustrating a pixel signal transfer method of the pixel signal transfer device shown in FIG. 2A, in accordance with an embodiment of the present invention.

FIG. 2A is a circuit diagram illustrating a pixel signal transfer device 200, in accordance with an embodiment of the present invention. FIG. 2B is a timing diagram illustrating a control signal timing of the pixel signal transfer device shown in FIG. 2A. FIG. 2C is a flow chart illustrating a pixel signal transfer method of the pixel signal transfer device shown in FIG. 2A, according to an embodiment of the present invention.

Referring FIGS. 2A and 2B, a transfer signal TX may be transferred from the row decoder 20 to the pixel signal transfer device 200. Also, a first switch control signal SC1, a second switch control signal SC2 and a third switch control signal SC3 may be transferred from the control unit 80 to the pixel signal transfer device.

Referring to FIG. 2A, the pixel signal transfer device 200 in accordance with an embodiment of the present invention includes a transfer block 210, a correction block 220 and a conversion gain adjusting block 230.

The transfer block 210 transfers to the correction block 220 a pixel output voltage generated by the pixel 11. The correction block 220 corrects the pixel output voltage corresponding to a threshold voltage of an amplification transfer transistor M included in the conversion gain adjusting block 230. The conversion gain adjusting block 230 adjusts a conversion gain for the corrected pixel output voltage, which is outputted from the correction block 220.

Herein, the pixel 11 may be implemented as a single transistor pixel including a photodiode PD and a transfer transistor MX. The photodiode PD may generate the pixel output voltage according to a charge corresponding to an incident light. The transfer transistor MX transfers the pixel output voltage from the photodiode PD to the transfer block 210 in response to the transfer signal TX applied to a gate terminal of the transfer transistor MX from the decoder 20. The transfer transistor MX is coupled between the photodiode PD and a first node A of the transfer block 210.

The transfer block 210 includes a transfer capacitor $C_L$ and a first switch S1. The transfer block 210 resets a remained charge of the pixel 11 using the first power supply voltage VPP. Herein, the transfer capacitor $C_L$ may include a parasitic capacitor of the column line.

The transfer capacitor $C_L$ is coupled between the first node A and the correction block 220. The first node A is also an output node of the pixel 11 and is provided with a first power supply voltage VPP through the first switch S1. The first switch S1 applies or blocks the first power supply voltage VPP to the first node A.

The correction block 220 includes second and fourth switches S2 and S4. The second and fourth switches S2 and S4 are switched on or off in response to a second switch control signal SC2, and are serially coupled between a second node B and a reference current source $I_{REF}$. The second node B is an input node of the correction block 220, to which the pixel output voltage corresponding to an amount of charge of the transfer capacitor $C_L$ of the transfer block 210 is provided, and is initialized with a voltage level of a second power supply voltage VDD reduced by a reference voltage and a threshold voltage of the amplification transistor M included in the conversion gain adjusting block 230. The reference voltage may be a voltage drop at a first resistor R1 when the reference current source $I_{REF}$ flows through the first resistor R1 included in the conversion gain adjusting block 230. The first resistor R1 and the amplification transistor M are serially coupled between the second power supply voltage VDD and an output node C of the conversion gain adjusting block 230. A gate of the amplification transistor M is coupled to the second node B. The second switch S2 is coupled between the second node B and output node C of the correction block 220. The fourth switch S4 is coupled between the reference current source $I_{REF}$ and the output node C of the correction block 220. The second and fourth switches S2 and S4 are coupled at the output node C of the correction block 220.

The conversion gain adjusting block 230 includes the first resistor R1, the amplification transistor M, a third switch S3 and a second resistor R2.

As described above, the first resistor R1 and the amplification transistor M are serially coupled between the second power supply voltage VDD and the output node of the conversion gain adjusting block 230. The gate of the amplification transistor M is coupled to the second node B. The amplification transistor M amplifies the pixel output signal provided from the transfer block 210 through the second node B.

The third switch S3 and the second resistor R2 are serially coupled to each other and coupled between the output node C of the conversion gain adjusting block 230 and a ground power supply voltage VSS. The output node C of the conversion gain adjusting block 230 may be coupled to the output node of the correction block 220. The third switch S3 is switched on or off in response to a third switch control signal SC3. The conversion gain adjusting block 230 adjusts the conversion gain according to a ratio between the first resistor R1 and the second resistor R2 (i.e., the second resistance value/the first resistance value). Herein, the first resistor R1 and the second resistor R2 may be implemented as a variable resistor.

Referring to FIGS. 2A to 2C, an operation process of the pixel signal transfer device 200 includes step S291 of resetting a photo detector, step S292 of performing a photoelectric-conversion operation, step S293 of initializing a node based on a threshold voltage value of an amplification transistor, step S294 of transferring a photoelectric-converted charge generated by step S292, and step S295 of correcting a pixel output voltage, which is converted according to an amount of a transferred charge.

At step S291, the pixel signal transfer device 200 resets a remained charge of the photodiode PD using the first power supply voltage VPP by switching on the first switch S1 and the transfer transistor MX.

The transfer transistor MX is turned on in response to the transfer signal TX having a high voltage level outputted from the row decoder 20 and the first switch S1 is switched on in response to the first switch control SC1 having a high voltage level outputted from the control unit 80 while the second and fourth switches S2 and S4 and the third switch S3 is switched off. Accordingly, as the first switch S1 is switched on, the remained charge on the photodiode PD is transferred to the first node A, and then the remained charge is reset by the first power supply voltage VPP.

At step S292, the pixel 11 may generate the charge corresponding to the incident light of the photodiode PD by exposing the photodiode PD while the second and fourth switches S2 and S4 and the third switch S3 are switched off, the transfer transistor MX is switched off in response to the transfer signal TX having a low voltage level outputted from the row decoder 20 and the first switch S1 is switched off in response to the first switch control signal SC1 having a low voltage level outputted from the control unit 80. may generate At step S293, the pixel signal transfer device 200 initializes the first node A with the first power supply voltage VPP, and initializes the second node B with the voltage level of the second power supply voltage VDD reduced voltage by the reference voltage and the threshold voltage of the amplification transistor M.

While the transfer transistor MX and the third switch S3 are switched off and the first switch S1 and the second and fourth switches S2 and S4 are switched on in response to the first switch control signal SC1 and the second switch control signal SC2 having high voltage levels outputted from the control unit 80, the first power supply voltage VPP is applied to the first node A and the first node A is initialized with the first power supply voltage VPP and the reference current $I_{REF}$ flows through the second node B. Therefore, the second node B is initialized with the voltage level of the second power supply voltage VDD reduced by the reference voltage and the threshold voltage of the amplification transistor M.

At step S294, the pixel signal transfer device 200 transfers the charge, which is photoelectrically converted by the photodiode PD at step S292, to the transfer capacitor $C_L$ (i.e., the parasitic capacitor at a column line), the transfer capacitor $C_L$ stores the transferred charge while the first to fourth switches S1 to S4 are switched off in response to the first switch control signal SC1, the second switch control signal SC2 having low voltage levels outputted from the control unit 80, and the transfer transistor MX is switched on in response to the transfer signal TX having a high voltage level outputted from the row decoder 20.

At step S295, the pixel signal transfer device 200 corrects the pixel output voltage corresponding to an amount of the transferred charge of the transfer capacitor $C_L$ according to the initial level (i.e., the voltage level of the second power supply voltage VDD reduced by the reference voltage and the threshold voltage of the amplification transistor M at step S293) of the second node B. And then, the pixel signal transfer device 200 adjusts the conversion gain using the first resistor R1 and the second resistor R2, and outputs the pixel signal VPIXEL.

While the first switch S1 and the second and fourth switches S2 and S4 are switched off, the transfer transistor MX is switched off in response to the transfer signal having the low voltage level outputted from the row decoder 20, and the third switch S3 is switched on in response to the third switch control signal SC3 having the high voltage level outputted from the control unit 80, the pixel output voltage corresponding to the amount of the transferred charge of the transfer capacitor $C_L$ is corrected according to the initial level (i.e., the voltage level of the second power supply voltage VDD reduced by the reference voltage and the threshold voltage of the amplification transistor M at step S293) of the second node B. And then, the pixel signal VPIXEL corresponding to the corrected pixel output voltage is outputted according to the conversion gain. The conversion gain is adjusted according to the ratio of the first resistor R1 and the second resistor R2. Herein, the voltage value of the pixel signal VPIXEL is expressed by equation 1.

$$VPIXEL = Q/C_L \times R2/R1 \qquad \text{[Equation 1]}$$

wherein, "VPIXEL" is the pixel signal, "Q" is the amount of the transferred charge of the transfer capacitor $C_L$, "$C_L$" is the capacitance of the transfer capacitor $C_L$, and R1 and R2 are resistances of the first and second resistors R1 and R2, respectively.

As seen from equation 1, the pixel signal VPIXEL corresponding to a final pixel output voltage depends on the amount of the charge ("Q") generated and transferred from the photodiode PD to the transfer capacitor $C_L$, the capacitance ("$C_L$") of the transfer capacitor $C_L$, and the first and second resistors R1 and R2. The pixel signal VPIXEL corresponds to the pixel output voltage corrected by the initial level (i.e., the voltage level of the second power supply voltage VDD reduced by the reference voltage and the threshold voltage of the amplification transistor M at step S293) of the second node B.

Herein, the independent variables (i.e., "Q", "$C_L$", "R1" and "R2") of equation 1 have larger values than variable values caused by a process variation and may be controlled easily. Therefore, these values are insensitive to the process variation. The conversion gain may be adjusted according to the first resistor R1 and the second resistor R2. Thus, in the embodiment of the present invention, the variety of a circuit design may be improved by having the transfer capacitor $C_L$, the first and second resistors R1 and R2 for adjusting the conversion gain, and the amplification transistor M, which may correct and adjust the threshold value thereof such that the amplification transistor M has characteristics insensitive to the process variation of the amplification transistor M.

Figure 3:
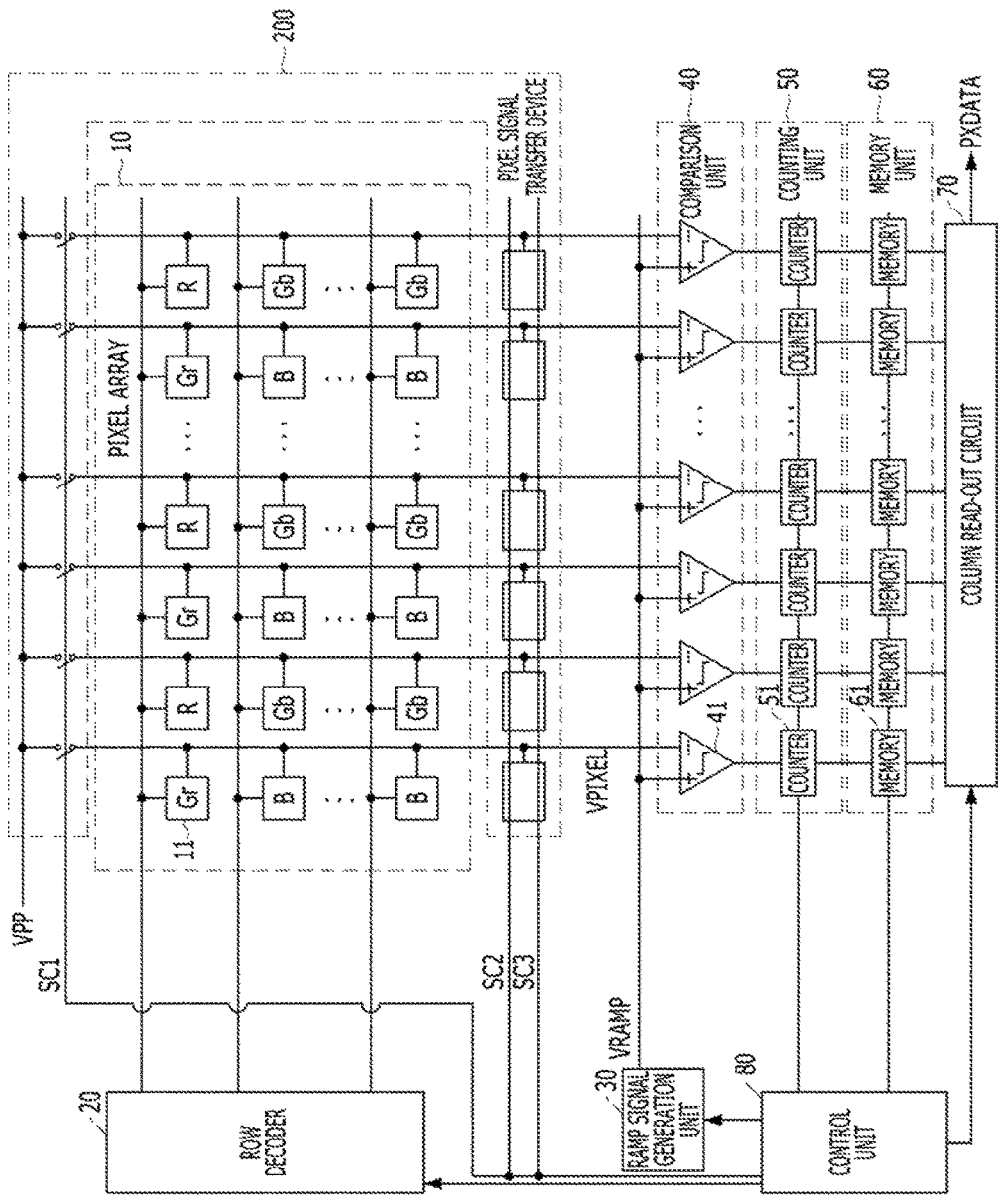
FIG. 3 is a block diagram illustrating a CMOS image sensor including the pixel signal transfer device shown in FIG. 2A, in accordance with an embodiment of the present invention.

FIG. 3 is a block diagram illustrating a CMOS image sensor including a pixel signal transfer device, in accordance with an embodiment of the present invention.

As shown in FIGS. 2A and 3, the CMOS image sensor includes a pixel array 10, a row decoder 20, a ramp signal generation device 30, the pixel signal transfer device 200, a comparison unit 40, a counting unit 50, a memory unit 60, a column read-out circuit 70 and a control unit 80.

The pixel array 10 may generate pixel output voltages according to charges corresponding to an incident light of photodiodes by exposing the photodiodes.

The row decoder 20 may select pixel in the pixel array 10 row by row according to the control of the control unit 80.

The ramp signal generation device 30 may generate a ramp signal VRAMP according to the control of the control unit 80.

The pixel signal transfer device 200 may correct the pixel output voltage using the threshold voltage of the amplification transistor M according to the control of the control unit 80, control the conversion gain, and output the pixel signal VPIXEL corresponding to the final pixel output voltage.

The comparison unit 40 may then compare the ramp signal VRAMP with the pixel signal VPIXEL outputted from the pixel signal transfer device 200.

The counting unit 50 may then count a clock of the control unit 80 according to respective output signals of the comparison unit 40. The memory unit 60 may then store the counting information of the counting unit 50 according to the control unit 80.

The column read-out circuit 70 may sequentially output the stored data of the memory unit 60 as the pixel data PXDATA according to the control of the control unit 80.

The control unit 80 controls operations of the row decoder 20, the ramp signal generation device 30, the pixel signal transfer device 200, the counting unit 50, the memory unit 60 and the column read-out circuit 70.

Herein, each pixel 11 of the pixel array 10 and the pixel signal transfer device 200 are same as those configurations shown in FIGS. 2A to 2C as described above.

Thus, the CMOS image sensor may perform a data conversion of the pixel signal VPIXEL through a single comparison operation. Since the other elements shown in FIG. 3 are similar to those elements shown in FIG. 1, the detailed descriptions of other elements shown in FIG. 3 will be omitted.

Although various embodiments of the present invention have been described for illustrative purposes, it will be apparent to those skilled in the art that various changes and modifications may be made without departing from the spirit and scope of the invention as defined in the following claims.

What is claimed is:

1. A pixel signal transfer device, comprising:
   a transfer block coupled to a pixel, suitable for transferring a pixel output voltage outputted from the pixel according to an amount of a charge generated from the pixel;
   a conversion gain adjusting block including an amplification transistor; and
   a correction block coupled between the transfer block and the conversion gain adjusting block, suitable for correcting the pixel output voltage using a threshold voltage of the amplification transistor,
   wherein the conversion gain adjusting block adjusts a conversion gain of the corrected pixel output voltage outputted from the correction block,
   wherein the conversion gain adjusting block includes:
   a first resistor coupled to a second power supply voltage reduced by a reference voltage,
   a second resistor coupled to a ground power supply voltage, and
   the amplification transistor coupled between the first resistor and an output node of the conversion gain adjusting block, and
   wherein the conversion gain is adjusted according to the first resistor and the second resistor.

2. The pixel signal transfer device of claim 1, wherein the transfer block includes:

a transfer capacitor coupled between a first node and the correction block, wherein the pixel output voltage and a first power supply voltage is supplied to the first node; and a first switch suitable for applying or blocking the first power supply voltage to the first node.

3. The pixel signal transfer device of claim 2, wherein the transfer block resets a remained charge of the pixel using the first power supply voltage.

4. The pixel signal transfer device of claim 2, wherein the transfer capacitor is a parasitic capacitor.

5. The pixel signal transfer device of claim 2,
wherein the correction block includes second and fourth switches suitable for coupling a second node and a reference current source,
wherein the second node is an input node of the correction block, to which the pixel output voltage is provided, and is initialized with a voltage level of the second power supply voltage reduced by the reference voltage and a threshold voltage of the amplification transistor,
wherein the reference voltage is a voltage drop at the first resistor included in the conversion gain adjusting block when the reference current source flows through the first resistor,
wherein the first resistor and the amplification transistor are serially coupled between the second power supply voltage and an output node of the conversion gain adjusting block,
wherein a gate of the amplification transistor is coupled to the second node,
wherein the second switch is coupled between the second node and an output node of the correction block, and
wherein the fourth switch is coupled between the reference current source and the output node of the correction block.

6. The pixel signal transfer device of claim 5,
wherein the conversion gain adjusting block further includes:
a third switch coupled between the output node of the conversion gain adjusting block and the second resistor, and
wherein the output node of the correction block and the output node of the conversion gain adjusting block are coupled to each other.

7. The pixel signal transfer device of claim 1, wherein the pixel is a single transistor pixel including:
a photo detector suitable for generating the pixel output voltage according to a charge corresponding to an incident light; and
a transfer transistor suitable for transferring the pixel output voltage of the photo detector,
wherein the transfer transistor is coupled between the photo detector and the transfer block.

8. A pixel signal transfer method of a pixel signal transfer device including a photo detector, first and second nodes, a transfer capacitor, first and second resistors and an amplification transistor, the pixel signal transfer method comprising:
resetting the photo detector;
performing a photoelectric-converted operation;
initializing the first node, and initializing the second node based on a threshold voltage value of the amplification transistor;
transferring a photoelectric-converted charge generated through the photoelectric-converted operation; and correcting a pixel output voltage corresponding to an amount of the transferred photoelectric-converted charge.

9. The pixel signal transfer method of claim 8, wherein the resetting of the photo detector includes resetting a remained charge on the photo detector using a first power supply voltage.

10. The pixel signal transfer method of claim 9, wherein the performing of the photoelectric-converted operation includes generating a charge corresponding to an incident light by exposing the photo detector.

11. The pixel signal transfer method of claim 10, wherein the initializing of the first and second nodes includes initializing the first node of the node to the first power supply voltage, and initializing the second node to a second power supply voltage reduced by a reference voltage and a threshold voltage of the amplification transistor.

12. The pixel signal transfer method of claim 11, wherein the transferring of the photoelectric-converted charge includes transferring the photoelectric-converted charge to the transfer capacitor.

13. The pixel signal transfer method of claim 12, wherein the correcting of the pixel output voltage includes:
correcting the pixel output voltage using a voltage level of the initialized second node; and
adjusting a conversion gain using the first and second resistors.

14. A complementary metal oxide semiconductor (CMOS) image sensor, comprising:
a pixel array suitable for generating a charge corresponding to an incident light;
a row decoder suitable for selecting each pixel of the pixel array row by row;
a ramp signal generation device suitable for generating a ramp signal;
a pixel signal transfer device including an amplification transistor, suitable for correcting each pixel output voltage outputted from each pixel of the pixel array using a voltage level of a threshold voltage of the amplification transistor, adjusting a conversion gain, and outputting each pixel signal;
a comparison unit suitable for comparing each pixel signal with the ramp signal;
a counting unit suitable for counting a clock according to each comparison signal outputted from the comparison unit;
a memory unit suitable for storing a counting information outputted from the counting unit; and
a column read-out circuit for outputting data stored in the memory unit,
wherein the pixel signal transfer device includes:
a plurality of transfer blocks each suitable for transferring a corresponding pixel output voltage according to an amount of a charge generated from a corresponding pixel,
a plurality of conversion gain adjusting blocks, and
a plurality of correction blocks each suitable for correcting a corresponding pixel output voltage using the voltage level of the threshold voltage of the amplification transistor,
wherein each of the plurality of conversion gain adjusting blocks adjusts a conversion gain of the corresponding pixel output voltage corrected from a corresponding correction block,
wherein each of the plurality of conversion gain adjusting blocks includes;

a first resistor coupled to a second power supply voltage reduced by a reference voltage, a second resistor coupled to a ground power supply voltage, and the amplification transistor coupled between the first resistor and an output node of the corresponding conversion gain adjusting block, and wherein the conversion gain is adjusted according to the first resistor and the second resistor.

15. The CMOS image sensor of claim 14, wherein each of the plurality of transfer blocks includes:

a transfer capacitor coupled between a first node and the corresponding correction block, wherein the pixel output voltage and a first power supply voltage is supplied to the first node; and a first switch suitable for applying or blocking the first power supply voltage to the first node.

16. The CMOS image sensor of claim 15, wherein each of the plurality of transfer blocks resets a remained charge of the corresponding pixel using the first power supply voltage.

17. The CMOS image sensor of claim 15, wherein the transfer capacitor is a parasitic capacitor.

18. The CMOS image sensor of claim 14, wherein each of the plurality of correction blocks includes:

second and fourth switches suitable for coupling a second node and a reference current source, wherein the second node is an input node of the corresponding correction block, to which the pixel output voltage is provided, and is initialized with the voltage level of the second power supply voltage reduced by the reference voltage and a threshold voltage of the amplification transistor, wherein the reference voltage may be a voltage drop at the first resistor included in the corresponding conversion gain adjusting block when the reference current source flows through the first resistor, wherein the first resistor and the amplification transistor are serially coupled between the second power supply voltage and an output node of the corresponding conversion gain adjusting block, wherein a gate of the amplification transistor is coupled to the second node, wherein the second switch is coupled between the second node and an output node of the corresponding correction blocks, and wherein the fourth switch is coupled between the reference current source and the output node of the corresponding correction block.

19. The CMOS image sensor of claim 18, wherein each of the plurality of conversion gain adjusting blocks further includes:

a third switch coupled between the output node of the corresponding conversion gain adjusting block and the second resistor, and wherein the output node of a corresponding correction block and the output node of the corresponding conversion gain adjusting block are coupled to each other.

* * * * *